US008602616B2

(12) United States Patent
Schoenfelder et al.

(10) Patent No.: US 8,602,616 B2
(45) Date of Patent: Dec. 10, 2013

(54) LAMP FOR A HEADLIGHT OF A MOTOR VEHICLE

(75) Inventors: Bernd Schoenfelder, Aachen (DE); Manfred Westemeyer, Aldenhoven (DE); Klaus Schoeller, Nideggen (DE); Kirsten G. Baeumges, Viersen (DE); Manfred Ruske, Kerpen (DE); Konrad Sell, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 233 days.

(21) Appl. No.: 13/127,742

(22) PCT Filed: Nov. 9, 2009

(86) PCT No.: PCT/IB2009/054972

§ 371 (c)(1), (2), (4) Date: May 5, 2011

(87) PCT Pub. No.: WO2010/055458

PCT Pub. Date: May 20, 2010

(65) Prior Publication Data

US 2011/0205749 A1 Aug. 25, 2011

(30) Foreign Application Priority Data

Nov. 14, 2008 (EP) .................................... 08169093

(51) Int. Cl.
*B60Q 1/04* (2006.01)
*B60Q 1/00* (2006.01)

(52) U.S. Cl.
USPC .......................................... 362/519; 362/516

(58) Field of Classification Search
USPC .................................................. 362/509–522
See application file for complete search history.

(56) References Cited

U.S. PATENT DOCUMENTS

| | | | |
|---|---|---|---|
| 4,814,960 A | 3/1989 | Liu | |
| 6,525,450 B2 | 2/2003 | Nakamura et al. | |
| 7,345,427 B2 | 3/2008 | Henninger et al. | |
| 2002/0021065 A1 * | 2/2002 | Gervelmeyer et al. | ....... 313/112 |
| 2003/0197455 A1 | 10/2003 | Oetken et al. | |

FOREIGN PATENT DOCUMENTS

| | | | |
|---|---|---|---|
| WO | 0184596 | A1 | 11/2001 |
| WO | 03083900 | A1 | 10/2003 |
| WO | 03090250 | A1 | 10/2003 |
| WO | 2004053924 | A2 | 6/2004 |
| WO | 2006109234 | A2 | 10/2006 |
| WO | 2007063453 | A2 | 6/2007 |
| WO | 2008032258 | A1 | 3/2008 |
| WO | WO 2008032258 | A1 * | 3/2008 |

* cited by examiner

*Primary Examiner* — Anh T. Mai
*Assistant Examiner* — Nathaniel Lee

(57) ABSTRACT

It is provided a lamp, particularly halogen lamp, for a headlight of a motor vehicle, comprising a light source (12) for emitting mainly white light, a mainly transparent envelope (14) encapsulating the light source (12) and a filter element (22) provided at the envelope (14), wherein the filter element (22) is adapted for deflecting visible light of a predefined wavelength interval such, that mainly blue light can be provided above a bright/dark-cutoff (28). Since the deflected bluish light is above the bright/dark-cutoff (28) an oncoming driver recognizes earlier the light. At the same time the oncoming driver is not blinded by the blue light above the bright/dark-cutoff (28), since not the whole emitted light (40) but only a smaller wavelength interval is directed above the bright/dark-cutoff (28).

14 Claims, 3 Drawing Sheets

LAMP FOR A HEADLIGHT OF A MOTOR VEHICLE

FIELD OF THE INVENTION

The invention relates to the field of lamps, particularly halogen lamps, like filament lamps, which may be used for automotive headlights.

BACKGROUND OF THE INVENTION

From WO 2004/053924 A2 a halogen lamp according to the H1, H7, H9 or H11 standard is known, which may be used for a headlight of an automobile. The halogen lamp comprises a filter element, by means of which mainly yellow light is directed to a road below a predefined bright/dark-cutoff for illuminating the road and mainly blue light is directed to the side of road below the bright/dark-cutoff for illuminating traffic signs.

Besides the property of such a lamp of not blinding an oncoming driver it is a permanent need that an oncoming motor vehicle should be well recognized by means of its headlights.

SUMMARY OF THE INVENTION

It is an object of the invention to provide a lamp, whose light is well recognizable by an oncoming driver without the risk of significantly blinding the oncoming driver.

This object is achieved by a lamp, particularly halogen lamp, for a headlight of a motor vehicle, comprising a light source for emitting mainly white light, a mainly transparent envelope encapsulating the light source and a filter element provided at the envelope, wherein the filter element is adapted for deflecting visible light of a predefined wavelength interval such, that mainly blue light can be provided above a bright/dark-cutoff.

The bright/dark-cutoff, by which an intended illuminated area for illuminating a road is preferably sharply separated from an intended not illuminated area for preventing a blinding of an oncoming driver, is usually predefined by the needs for a headlight of a motor vehicle for which the lamp, particularly halogen lamp, should be used, wherein the needs for the bright/dark-cutoff may be derived from technical standards for a specific state. Due to the deflected mainly blue light above the bright/dark-cutoff the light appears more bluish for an oncoming driver. Since at night blue light is better absorbed by the light-sensitive rods of the eyes of the oncoming driver, the light of the lamp according to the invention is well recognizable. Since the deflected bluish light is above the bright/dark-cutoff the oncoming driver becomes earlier aware of the light. An oncoming motor vehicle may be recognized earlier leading to an improved traffic safety. At the same time the oncoming driver is not blinded by the blue light above the bright/dark-cutoff, since not the whole emitted light but only a smaller wavelength interval is directed above the bright/dark-cutoff. It is used the insight that the optical system for a motor vehicle headlight is adjusted with respect to a center of light beams, which begin at the light source of the lamp, for instance a filament of the lamp. Since a predefined wavelength interval of the emitted light is deflected by the filter element at the envelope a few light beams, namely the deflected light beams, begin at the envelope, this means are shifted with respect to the light source of the lamp. Due to the shifted origin of the deflected light beams the optical system of the headlight directs at least a part of the deflected light beams above the bright/dark-cutoff intentionally without the need of changing the optical system. By adjusting the filter properties as well as the shape and the dimensions of the filter element the luminance and the luminous flux may be adjusted as demanded. The illuminance of the deflected light above the bright/dark-cutoff may be kept low enough for not blinding oncoming traffic for instance by means of selecting a small enough wavelength interval for the filter element, scattering the deflected light beams by means of a light diffuser and/or filtering a part of the luminous flux of the deflected light by means of a further filter. The illuminance of the light above the bright/dark-cutoff may be low enough adjusted that the risk of significantly blinding the oncoming driver is not significantly increased or even prevented. Since only a low illuminance above the bright/dark-cutoff is sufficient, it is not necessary to deflect every light beam with a wavelength within the predefined wavelength interval, but only a part. The color of the undeflected light intentionally used for illuminating an area below the bright/dark-cutoff may be mainly unchanged and may stay mainly white. Further the bluish appearance for the oncoming driver is not provided by emitting more blue light by means of operating the lamp at higher temperatures of a filament or the like, but by a wavelength-selective deflection of the present light. This has mainly no adverse effect to the life time of the lamp. An increased wear of the electrical components, like a filament, does not occur.

Preferably the filter element is adapted such that the deflected light above the bright/dark-cutoff comprises a color which lies with respect to the CIE 1931 diagram on the border of or within a rectangle with the x,y-coordinates (0.380; 0.335), (0.380; 0.392), (0.430; 0.425), (0.410; 0.357), particularly (0.390; 0.345), (0.390; 0.400), (0.410; 0.412), (0.410; 0.365) and preferred (0.392; 0.361); (0.392, 0.372); (0.408; 0.392); (0.408; 0.388). Due to this color of the deflected light the light is better absorbed by the light-sensitive rods of the eyes of the oncoming driver. Further this color may be adjusted by the filter element without additional effort. Particularly the light emitted by the light source of a typical halogen lamp comprises components with lies within this x,y-coordinates so that such a color may be provided above the bright/dark-cutoff without the need of changing the emissions spectrum of the light source. At the same time the components of the emitted light, which lies within the aforementioned x,y-coordinates, are not so much that an oncoming driver may be blinded.

Particularly the filter element is adapted such that the deflected light above the bright/dark-cutoff comprises an illuminance $E_v$ of 0.1 lux$\leq E_v \leq$1.0 lux, particularly 0.2 lux$\leq E_v \leq$0.8 lux and preferably 0.4 lux$\leq E_v \leq$0.6 lux. This illuminance is high enough of being recognized by an oncoming driver but not so high of blinding the oncoming driver. The illuminance is particularly measured in a distance of 25 m from the lamp.

In a preferred embodiment the filter element is adapted such that the deflected light above the bright/dark-cutoff comprises a color temperature T of 3000 K$\leq$T$\leq$4000 K, particularly 3200 K$\leq$T$\leq$3800 K and preferably 3400 K$\leq$T$\leq$3600 K. Due to this color temperature the bluish appearance of the deflected light above the bright/dark-cutoff is ensured.

In a preferred embodiment the filter element is completely or only partially arranged on an inner surface and/or an outer surface of the envelope. The filter element may be provided by means of a coating, so that it is not necessary to use a specific material for the envelope, which may be a glass body consisting mainly of $SiO_2$. Due to the envelope a robust substrate is provided for applying the filter material of the filter element for instance by sputtering. The envelope may be mainly filled by an inert gas and may comprise at least one halogen element, like bromine, iodine or chlorine.

Particularly the envelope is only partially provided with the filter element. Particularly the filter element is shaped and positioned such that an amount a of the luminous flux of the emitted light of 30%≤a≤98%, particularly 50%≤a≤95%, preferably 70%≤a≤90% and most preferred 75%≤a≤80% escapes the envelope unfiltered. This means that a significant amount of the emitted light passes by the filter element without being filtered. For instance most of the luminous flux may escape the lamp without being influenced by the filter element. The illuminance of the lamp is not significantly affected by the filter element. Particularly the color of the lamp is not significantly affected by the filter element.

Particularly the filter element comprises an interference filter and/or an absorption filter. The interference filter may comprise several layers of different thickness and different indices of refraction, which are chosen such that only light with a particular wavelength or a particular wavelength interval is transmitted or reflected. Since the reflected light, this means the deflected light, may meet at a different place at the envelope the interference filter under a different angle, the reflected light is able to transmit the interference filter without being reflected again. The luminance of the lamp is not significantly affected. By means of the absorption filter light with a particular wavelength is absorbed leaving the light with a significant different wavelength nearly unchanged. Further the absorption filter may scatter and/or emit light with a particular wavelength or wavelength interval. Due to the design of the filter element a specific color of the deflected light may be adjusted.

In a preferred embodiment an amount v of the luminous flux of the emitted light in the range of the predefined wavelength interval is reflected by means of the interference filter, wherein the amount v is 5%≤v≤80%, particularly 10%≤v≤70%, preferably 15%≤v≤60% and most preferred 20%≤v≤50%. Since only a part of the luminous flux of the predefined wavelength interval is reflected, the other part may transmit the interference filter without being reflected, so that the color of the lamp below the bright/dark-cutoff is not significantly changed. The emitted light directed below the bright/dark-cutoff may comprise all relevant wavelengths of the visible light spectrum, so that the color appears mainly white. Further it is possible to provide the whole envelope of the lamp with the interference filter, for instance by means of a coating, wherein at the same time the predefined wavelength interval is not completely filtered from the light intended for illuminating the area below the bright/dark-cutoff.

Particularly the interference filter comprises a reflectivity R(λ) below an upper border and above a lower border, wherein the upper border is R(λ)=70% for 380 nm≤λ≤525 nm, R(λ)=70%-50%·(λ−525 nm)/75 nm, for 525 nm≤λ≤600 nm, and R(λ)=20% for 600 nm≤λ−780 nm and wherein the lower border is R(λ)=20% for 380 nm≤λ≤450 nm, R(λ)=20%−20%·(λ−450 nm)/50 nm, for 525 nm≤λ≤500 nm and R(λ)=0% for 500 nm≤λ≤780 nm. At a reflection R(λ)=0% none of the specific wavelength λ is reflected, wherein at a reflection R(λ)=100% all of the specific wavelength λ is reflected. An interference filter, which reflection properties lay between the upper border and the lower border, provides a more bluish appearance without significantly reducing the illuminance.

Preferably the absorption filter comprises scattering particles, particularly consisting of $CoAl_2O_4$, wherein the scattering particles comprise an average diameter d of 500 nm≤d≤6 μm, particularly 600 nm≤d≤5 μm, preferably 750 nm≤d≤3 μm and most preferred 900 nm≤d≤1 μm, wherein the absorption filter comprises a weight fraction w of the scattering particles of particularly 2%≤w≤40%, preferably 3%≤w≤30%, more preferred 5%≤w≤15% and most preferred 7%≤w≤10%. In comparison to usual absorption particles used for an absorption filter the scattering particles are bigger and/or more. Due to the scattering particles the light is scattered in several directions. Most preferred the scattering particles are at the same time absorption particles, which absorb and/or emit light with a particular wavelength like $CoAl_2O_4$.

In a preferred embodiment the filter element comprises a filter effect particularly by reflection and/or absorption at a wavelength λ of 300 nm≤λ≤700 nm, particularly 350 nm≤λ≤650 nm, preferably 380 nm≤λ≤600 nm and most preferred 400 nm≤λ≤500 nm. Outside theses wavelength intervals a filter effect of the filter element is mainly not provided, this means less than 1% of the luminous flux of a specific wavelength is deflected by the filter element. By means of these wavelength intervals a suitable color is adjusted for providing a bluish appearance of the light above the bright/dark-cutoff for an oncoming driver.

Preferably an antiglare cap is provided at a distal end of the halogen lamp. Due to the antiglare cap a direct light beam from the light source of the lamp to a driver of an oncoming motor vehicle is prevented.

The invention further relates to a reflection system for a headlight of a motor vehicle, comprising a lamp, which may be designed as previously described, and a reflector for directing direct light beams, which begin at the light source and meet the reflector along a direct beam path, below the bright/dark-cutoff, wherein the reflector is adapted to direct at least a part of deflected light beams, which begin at the filter element, above the bright/dark-cutoff. The reflector may be specifically shaped to adjust the illuminance below the bright/dark-cutoff as demanded. The reflector further may provide the bright/dark-cutoff. For instance the reflector may be shaped such, that no reflection surface is present, that would direct a direct light beam originated at the light source above the intended bright/dark cutoff. At the same time the reflector may be shaped such, that deflected light beams, which originate at the envelope of the lamp, may be directed above the intended bright/dark-cutoff. For instance the reflector may provide a mainly bluish halo, which extends at least partially above the bright/dark-cutoff. The halo is mainly matt or opal, so that an oncoming driver is not blinded. The reflection system provides light, which is well recognizable by an oncoming driver without the risk of significantly blinding the oncoming driver.

The invention further relates to a headlight for a motor vehicle comprising a lamp, which may be designed as previously described, and/or a reflection system, which may be designed as previously described, wherein a light beam channel for directing at least a part of deflected light beams, which are deflected by means of the filter element, above the bright/dark-cutoff is provided. The light beam channel is free of shutters, cover elements, apertures, blinds or other optical elements, which may stop all deflected light beams. Due to the shape and the design of the light beam channel at least a part of the deflected light beams may be directed above the bright/dark-cutoff. The headlight provides light, which is well recognizable by an oncoming driver without the risk of significantly blinding the oncoming driver.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
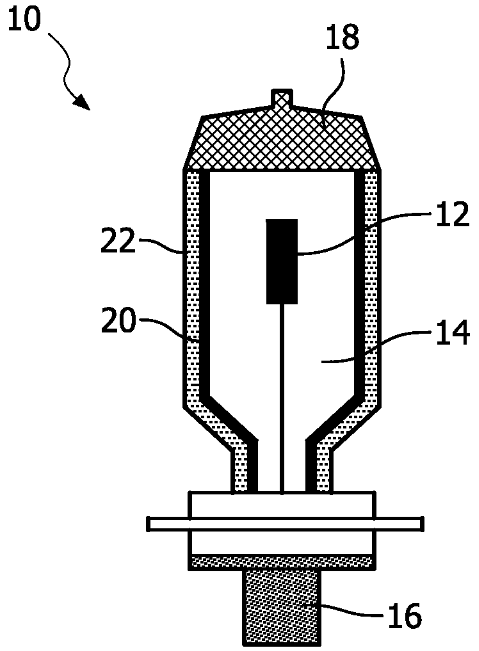
FIG. 1 is a schematic side view of a lamp according to the invention.

The lamp 10 as illustrated in FIG. 1 is a halogen lamp of the H7 standard. The halogen lamp 10 comprises as light source a filament 12, which is protected by an envelope 14 in the form of a transparent glass body. By means of connectors 16 provided at a proximal end of the envelope 14 an electrical current may be applied to the filament 12. At a distal end of the envelope 14 an antiglare cap 18 is provided. On an outer surface 20 of the envelope 14 a filter element 22 is provided, which may be an interference filter and/or an absorption filter. In the illustrated embodiment the envelope 14 is completely coated by the filter element 22. In the alternate the filter element 22 could be only partially provided on the envelope 14, so that only a part of the emitted light is filtered. By means of the filter element 22 light is deflected above a predefined bright/dark-cutoff of a headlight comprising the lamp 10.

Figure 2:
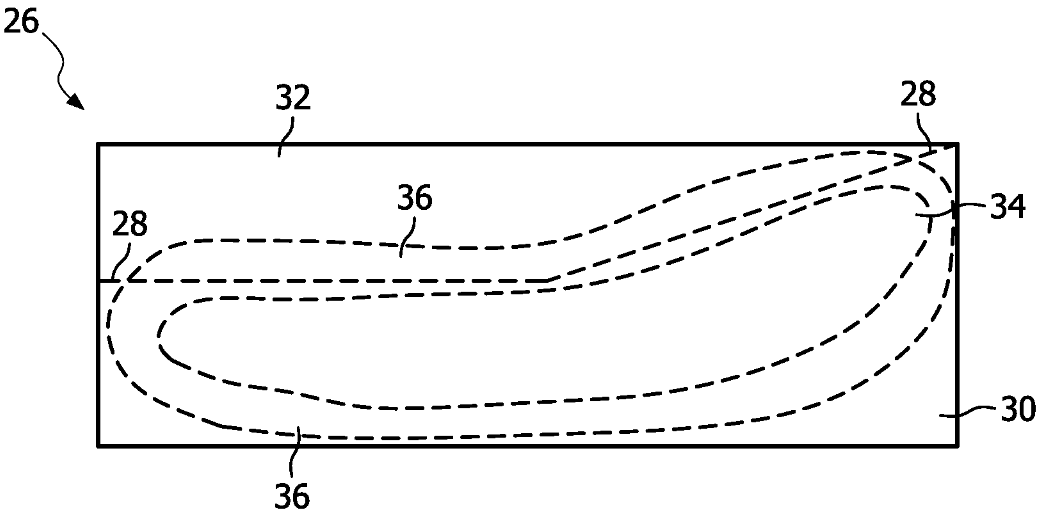
FIG. 2 is a schematic illustration of the traffic space illuminated by means of the lamp of FIG. 1.

As illustrated in FIG. 2 a traffic space 26 in front of an automobile is divided by a bright/dark-cutoff 28 in an illuminated area 30 and a not illuminated area 32. Typical automobile headlights provide a beam pattern 34 below the bright/dark-cutoff 28 for illuminating a road and traffic signs. In the illustrated embodiment the bright/dark-cutoff 28 is chosen with respect to right hand traffic, where the traffic signs are positioned on the right side. Usually light above the bright/dark-cutoff 28 should be prevented for not blinding an oncoming driver. The lamp 10 according to the invention directs a low amount of the emitted light with a wavelength of mainly blue light by deflection on the filter element 22 in a deflection area 36, which at least partially is located above the bright/dark-cutoff 28. Due to the mainly blue light above the bright/dark-cutoff 28 the light of the lamp 10 is well recognizable by an oncoming driver. Since the illuminance of the deflected light in the deflection area 36 may be adjusted comparatively low, the risk of significantly blinding the oncoming driver is prevented.

Figure 3:
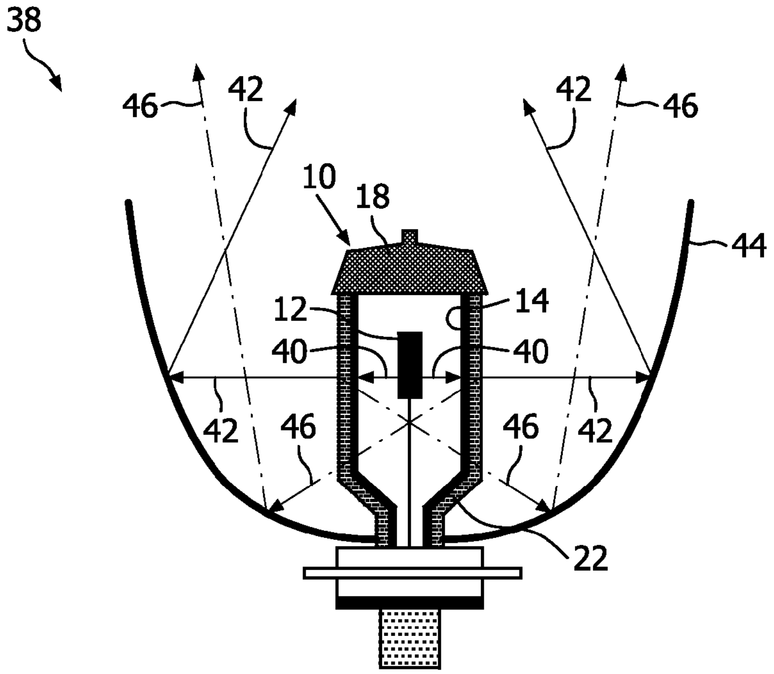
FIG. 3 is a schematic side view of a reflection system comprising a lamp according to the invention with an interference filter.

The illumination of the traffic space 26 as illustrated in FIG. 2 may be provided by means of a reflection system 38 as illustrated in FIG. 3. The reflection system comprises a lamp 10 according to the invention, which comprises in the illustrated embodiment an interference filter as filter element 22. The filament 12 emits emitted light beams 40. Most of the emitted light beams 40 are direct light beams 42, which are not reflected by the interference filter 22. The direct light beams 42 are reflected by means of a reflector 44 below the bright/dark-cutoff 28 in the beam pattern 34. A low amount of the emitted light beams 40 are reflected by the interference filter 22. These deflected light beams 46 originates at the interference filter 22 at the envelope 14. Due to the different origin with respect to the direct light beams 42 the deflected light beams 46 are reflected by means of the reflector 44 in the deflection area 36 and thus at least partially above the bright/dark-cutoff 28.

Figure 4:
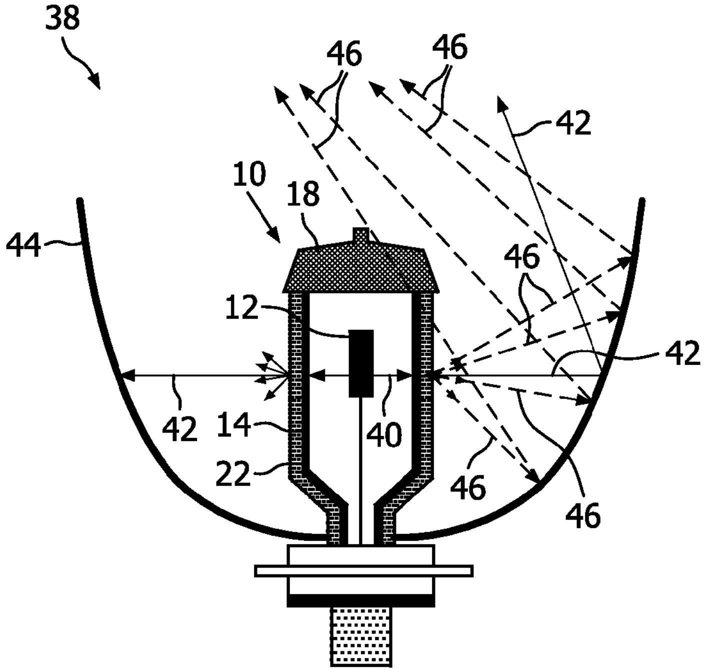
FIG. 4 is a schematic side view of a reflection system comprising a lamp according to the invention with an absorption filter.

Mainly the same effect can be obtained by means of the reflection system 38 as illustrated in FIG. 4, wherein the filter element 22 is not an interference filter but an absorption filter. The absorption filter 22 comprises particles, which scatter and/or absorb and emit light within a specific wavelength interval. This leads to a plurality of deflected light beams 46 originating from the absorption filter 22 at the envelope 14. The direct light beams 42, which are not filtered, are directed in the light beam pattern 34, wherein the deflected light beams 46 are directed for instance by means of a further reflector in the deflection area 36.

Figure 5:
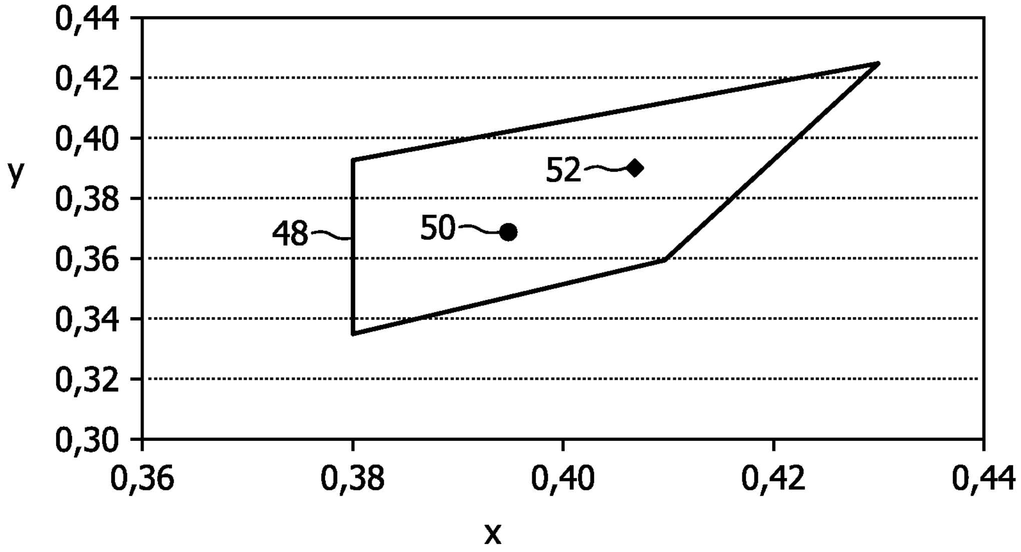
FIG. 5 is a schematic diagram of a suitable chromaticity coordinate of the light deflected by the lamp according to the invention and FIG. 6 is a schematic diagram of the filter properties of a suitable filter element for the lamp according to the invention.

The light deflected above the bright/dark-cutoff 28 comprises a color, which lies on or within a rectangle defined by a border line 48 in FIG. 5, by which an area of suitable chromaticity coordinates x,y are defined according to the CIE 1931 diagram. In the diagram only a part is shown, where the x-coordinate is in the range from 0.36 to 0.44 and the y-coordinate is in the range from 0.30 to 0.44. A first chromaticity coordinate 50 illustrated by a circle is provided by an interference filter 22 comprising the following layers:

| Layer | Material | Thickness (nm) | refractive index |
|---|---|---|---|
| 0 (Substrate) | SiO2 | | |
| 1 | Si3N4 CVD | 8.38 | 2.05 |
| 2 | SiO2 CVD | 42.8 | 1.45 |
| 3 | Si3N4 CVD | 74.25 | 2.05 |
| 4 | SiO2 CVD | 42.8 | 1.45 |
| 5 | Si3N4 CVD | 74.25 | 2.05 |
| 6 | SiO2 CVD | 42.8 | 1.45 |
| 7 | Si3N4 CVD | 74.25 | 2.05 |
| 8 | SiO2 CVD | 145.79 | 1.45 |
| Medium | Air | | |

The different layers comprising mainly $SiO_2$ and $Si_3N_4$ are provided by a thermal chemical vapor deposition (CVD). This interference filter comprises a color temperature of mainly 3550 K. A second chromaticity coordinate 30 illustrated by a square is provided by an absorption filter, which provides light with a color temperature of mainly 3450 K.

Figure 6:
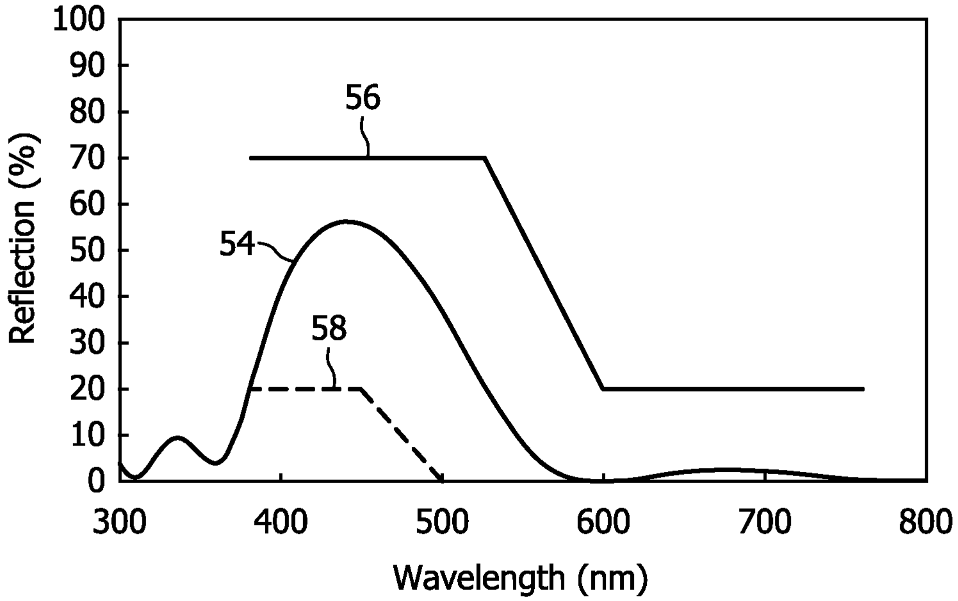

Due to the composition of the first example of the above mentioned CVD interference filter 22 a reflection curve 54 as illustrated in FIG. 6 is provided. In FIG. 6 the percentage of the reflection is illustrated in dependence of the wavelength 2. At a reflection R=0% none of the specific wavelength 2, is reflected, wherein at a reflection R=100% all of the specific wavelength λ is reflected. As can be derived from the reflection curve 54 mainly blue light is reflected and thus deflected above the bright/dark-cutoff 28, wherein mainly yellow and red light is not reflected by the filter element 22 and guided as intended to the beam pattern 34 below the bright/dark-cutoff 28 for illuminating a road or the like. The reflection curve 54 of the filter element 22 is particularly below an upper border 56 and above an lower border 58.

While the invention has been illustrated and described in detail in the drawings and foregoing description, such illustration and description are to be considered illustrative or exemplary and not restrictive; the invention is not limited to the disclosed embodiments. For example, it is possible to operate the invention in an embodiment wherein the shape of the filter element 22 is changed. For example the filter element 22 may be a partial coating of any shape and size and/or a plurality of individual partial coatings, which are arranged separated to each other. Further the halogen lamp 10 may be adapted to fit a different lamp standard like H1, H7, H9 or H11. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. A lamp for a headlight of a motor vehicle, comprising a light source for emitting mainly white light, a substantially transparent envelope encapsulating the light source and a filter element provided at the envelope, wherein the filter element is adapted for deflecting visible light of a predefined wavelength interval such that blue light is provided above a bright/dark-cutoff.

2. The lamp according to claim 1 wherein the filter element is adapted such that the deflected light above the bright/dark-cutoff comprises a color which lies with respect to the CIE 1931 diagram on the border of or within a rectangle with the x,y-coordinates (0.380; 0.335), (0.380; 0.392), (0.430; 0.425), (0.410; 0.357).

3. The lamp according to claim 1 wherein the filter element is adapted such that the deflected light above the bright/dark-cutoff comprises an illuminance $E_v$ of 0.1 lux≤$E_v$≤1.0 lux.

4. The lamp according to claim 1 wherein the filter element is adapted such that the deflected light above the bright/dark-cutoff comprises a color temperature T of 3000 K≤T≤4000 K.

5. The lamp according to claim 1 wherein the lifter element is at least partially arranged on an inner surface and/or an outer surface of the envelope.

6. The lamp according to claim 1 wherein the filter element is shaped and positioned such that an amount a of the luminous flux of the emitted light of 30%≤a≤98% escapes the envelope unfiltered.

7. The lamp according to claim 1 wherein the filter element comprises an interference filter and/or an absorption filter.

8. The lamp according to claim 7 wherein an amount v of the luminous flux of the emitted light in the range of the predefined wavelength interval is reflected by means of the interference filter, wherein the amount v is 5%≤v≤80.

9. The lamp according to claim 7 wherein the interference filter comprises a reflectivity R(λ) below an upper border and above a lower border, wherein the upper border is R(λ)=70% for 380 nm≤λ≤525 nm, R(λ)=70%-50%·(λ−525 nm)/75 nm, for 525 nm≤λ≤600 nm, and R(λ)=20% for 600 nm≤λ≤780 nm and wherein the lower border is R(λ)=20% for 380 nm≤λ≤450 nm, R(λ)=20%-20%·(λ−450 nm)/50 nm, for 525 nm≤λ≤500 nm and R(λ)=0% for 500 nm≤λ≤780 nm.

10. The lamp according to claim 7 wherein the absorption filter comprises scattering particles, having an average diameter d of 500 nm≤d≤6 μm, wherein the absorption filter comprises a weight fraction w of the scattering particles of 2%≤w≤40%.

11. The lamp according to claim 1 wherein the filter element comprises a filter effect by reflection and/or absorption at a wavelength λ of 300 nm≤λ≤700 nm.

12. The lamp according to claim 1 wherein an antiglare cap is provided at a distal end of the halogen lamp.

13. A reflection system for a headlight of a motor vehicle, comprising the lamp according to claim 1 and a reflector for directing direct light beams, which begin at the light source and meet the reflector along a direct beam path, below the bright/dark-cutoff, wherein the reflector is adapted to direct at least a part of deflected light beams, which begin at the filter element, above the bright/dark-cutoff.

14. A headlight for a motor vehicle comprising the reflection system according to claim 13, wherein a light beam channel for directing at least a part of deflected light beams, which are deflected by means of the filter element, above the bright/dark-cutoff is provided.

* * * * *